US010645247B2

(12) United States Patent
Kalkbrenner (10) Patent No.: US 10,645,247 B2
(45) Date of Patent: *May 5, 2020

(54) CONFOCAL MICROSCOPE WITH A PINHOLE ARRANGEMENT

(71) Applicant: Carl Zeiss Microscopy GmbH, Jena (DE)

(72) Inventor: Thomas Kalkbrenner, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 109 days.

This patent is subject to a terminal disclaimer.

(21) Appl. No.: 15/990,793

(22) Filed: May 28, 2018

(65) Prior Publication Data

US 2018/0341095 A1    Nov. 29, 2018

Related U.S. Application Data

(63) Continuation of application No. 14/432,858, filed as application No. PCT/EP2013/070207 on Sep. 27, 2013, now Pat. No. 9,983,395.

(30) Foreign Application Priority Data

Oct. 1, 2012  (DE) .................. 10 2012 217 967

(51) Int. Cl.
   *G02B 21/00*    (2006.01)
   *H04N 1/04*    (2006.01)
   *G02B 6/04*    (2006.01)

(52) U.S. Cl.
   CPC ............. *H04N 1/04* (2013.01); *G02B 21/004* (2013.01); *G02B 21/0032* (2013.01);
   (Continued)

(58) Field of Classification Search
   CPC ................................ G02B 21/0032
   See application file for complete search history.

(56) References Cited

U.S. PATENT DOCUMENTS

| 5,563,710 A | 10/1996 | Webb et al. |
| 6,967,711 B2 | 11/2005 | Gui |

(Continued)

FOREIGN PATENT DOCUMENTS

| JP | 05-075719 | 10/1993 |
| JP | 06-160728 | 6/1994 |

(Continued)

OTHER PUBLICATIONS

Notification of Reason for Rejection for JP Application No. 2015-533612 dated Jul. 1, 2017.

(Continued)

*Primary Examiner* — Thanh Luu
(74) *Attorney, Agent, or Firm* — Haug Partners LLP (57) ABSTRACT

A microscope for raster-free, confocal imaging of a sample arranged in a sample space has an illumination arrangement comprising a light source group having light sources which can be switched on individually, a detector arrangement, a pinhole arrangement which comprises a pinhole array and which has a plurality of pinhole elements which are adjacent to one another, wherein there is one pinhole element provided for each light source, and optics which irradiate each pinhole element with radiation of an individual light source of the light source group and confocally illuminate an individual spot located in the sample space, wherein one of the individual spots is associated with each pinhole element, and the individual spots are adjacent to one another in the sample space with respect to an incidence direction of the radiation, and the optics image the individual spots through the pinhole arrangement confocally on the detector arrangement.

16 Claims, 5 Drawing Sheets

(52) U.S. Cl.
CPC ..... *G02B 21/0036* (2013.01); *G02B 21/0052* (2013.01); *G02B 6/04* (2013.01)

(56) References Cited

U.S. PATENT DOCUMENTS

| | | | |
|---|---|---|---|
| 7,518,149 | B2 | 4/2009 | Maasskant et al. |
| 2001/0012069 | A1 | 8/2001 | Derndinger et al. |
| 2002/0134921 | A1 | 9/2002 | Cathey, Jr. |
| 2004/0147810 | A1 | 7/2004 | Mizuno |
| 2004/0247268 | A1 | 12/2004 | Ishihara et al. |
| 2006/0011832 | A1 | 1/2006 | Wolleschensky et al. |
| 2006/0033988 | A1 | 2/2006 | Mikuriya et al. |
| 2006/0072191 | A1 | 4/2006 | Akiyama et al. |
| 2009/0218527 | A1* | 9/2009 | French ................ G02B 21/004 250/578.1 |

FOREIGN PATENT DOCUMENTS

| | | |
|---|---|---|
| JP | 08-211296 | 8/1996 |
| JP | 2004-222870 | 8/2004 |
| JP | 2004-317437 | 11/2004 |
| JP | 2006-071784 | 3/2006 |
| JP | 2007-064802 | 3/2007 |

OTHER PUBLICATIONS

A. Bullen et al, "*High-Speed, Random-Access Fluorescence Microscopy: I. High-Resolution Optical Recording with Voltage-Sensitive Dyes and Ion Indicators*", Biophysical Journal, vol. 73, Jul. 1997, pp. 477-491.

International Search Report for Application No. PCT/EP2013/070207 dated May 12, 2013.

Chongxiang Li et al: "*Double Detector-Arrays 3-D Profile Inspection System*" Novel Optical Systems Design and Optimization V. 9 Jul. 2002 Seattle. WA. USA, pp. 116-123. XP05509040, DOI: 10.1117/12.482184.

Li Hai-yan et al: "*Theoretical Analysis of Multi-probe Confocal 3-D Detection System*" Proceedings of SPIE. Jan. 30, 2007 (Jan. 30, 2007). pp. 659526-659526-4. XP055090110. ISSN: 0277-786X. DOI: 10.1117/12.726451.

Shi Yan et al: "*Fast Confocal Endomicroscopy Based on Multi-fiber Parallel Scanning*" Proceedings of SPIE. vol. 7845. Nov. 3, 2010 (Nov. 3, 2010), pp. 78451C-78451C-6. XP055090397. ISSN: 0277-786X. DOI: 10.1117/12.870627.

Notification of Transmittal of Translation of the International Preliminary Report on Patentability dated Apr. 7, 2015.

\* cited by examiner

CONFOCAL MICROSCOPE WITH A PINHOLE ARRANGEMENT

The present application is a continuation of U.S. patent application Ser. No. 14/432,858 filed on Apr. 1, 2015, which claims priority from PCT Patent Application No. PCT/EP2013/070207 filed on Sep. 27, 2013, which claims priority from German Patent Application No. DE 10 2012 217 967.4 filed on Oct. 1, 2012, the disclosures of which are incorporated herein by reference in their entirety.

FIELD OF THE INVENTION

It is noted that citation or identification of any document in this application is not an admission that such document is available as prior art to the present invention.

In microscopy, confocal microscopy is a well-established possibility for combining a high spatial resolution with a high depth of focus. A selection of the depth plane that is imaged is made by means of confocal imaging. Usually, confocal microscopy is realized as fluorescence microscopy in which fluorescence is excited in a sample by illumination radiation and the emitted fluorescent radiation is detected confocally. Since the illumination of the sample puts a strain on fluorophores and excessive illumination can lead to bleaching of fluorophores, an effort is made to illuminate the sample only in those places where it is imaged. Therefore, it has proven successful to illuminate the sample confocally also, so that ultimately sample regions which are not imaged are not illuminated.

As is well known, confocal imaging is carried out in the prior art by means of a pinhole serving as confocality filter. Typically, the sample is illuminated through the pinhole confocally in a spot and the fluorescent radiation proceeding from this spot is imaged confocally on a detector through the same pinhole. The size of the spot determines the spatial resolution laterally, i.e., transverse to the direction of light incidence, and also determines the depth of focus simultaneously. In order to image a sample, the position of the confocally imaged spot is displaced in the sample. Scanners which correspondingly deflect the beam path have proven successful for this purpose.

A particularly fast deflection is achieved with oscillating mirror arrangements which bring about a deflection along two axes, i.e., the displacement of the spot in a plane, which is perpendicular to the light incidence direction. Oscillating mirror arrangements automatically result in a predefined path curve along which the spot is displaced. The sample is usually scanned through a raster-shaped displacement of the spot.

Accordingly, sample regions which are of no interest for the actual imaging task are sometimes illuminated. This results in a longer imaging duration and possibly unwanted bleaching of fluorophores. To overcome this disadvantage, the publication by A. Bullen, "High-Speed, Random-Access Fluorescence Microscopy: I. High-Resolution Optical Recording with Voltage-Sensitive Dyes and Ion Indicators", *Biophysical Journal*, Vol. 73, July 1997, pages 477-491, describes a confocal microscope having a scanner which uses a beam deflection by means of acousto-optic modulators. This eliminates the limitation to raster scanning, and the illuminated, imaged spot can be displaced, e.g., along structures in the sample which are of particular interest. However, these advantages can be achieved in the prior art only in conjunction with an acousto-optic modulator, which is disadvantageous with respect to optical quality, particularly transmission. Bullen et al. can use a modulator of this type only in the special form of two-photon microscopy because otherwise the light losses from passing twice through the modulator would be too great. In addition, its deflecting behavior varies with the intensity of the radiation.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph), such that applicant(s) reserve the right to disclaim, and hereby disclose a disclaimer of, any previously described product, method of making the product, or process of using the product.

SUMMARY OF THE INVENTION

Therefore, the invention has the object of providing a confocal microscope having the possibility of random access scanning which overcomes these disadvantages of the prior art.

This object is met according to the invention by a microscope for raster-free, confocal imaging of a sample arranged in a sample space. The microscope has an illumination arrangement having a light source group comprising light sources which can be switched on individually. Further, a pinhole arrangement which comprises a pinhole array and which has a plurality of pinhole elements which are adjacent to one another is provided in the microscope, wherein there is one pinhole element provided for each light source of the light source group. Optics comprise lenses which are arranged and configured jointly with the illumination arrangement and pinhole array such that radiation from exactly one of the light sources passes through each pinhole element and is imaged confocally in an individual spot located in the sample space. One of the individual spots is associated with each pinhole element. The individual spots are stationary and lie adjacent to one another in the sample space with respect to an incidence direction of the radiation. The optics have further elements which image the individual spots through the pinhole arrangement confocally on a detector arrangement. In so doing, the lenses of the optics can illuminate, i.e., provide the individual spots located confocally in the sample space, and also image the individual spots through the pinhole elements confocally on the detector arrangement. When imaging on the detector arrangement, the same pinhole array as that utilized for the illumination or a second conjugate pinhole array can be used. In the latter variant, the pinhole arrangement comprises two pinhole arrays.

Accordingly, unlike the prior art, the microscope has no external scanning device which displaces an individual spot in the sample space for imaging the sample. Rather, the scanning of the sample is carried out through a plurality of stationary individual spots, and changing between active individual spots takes place by switching the individual light sources on and off. When an individual light source is switched on and the stationary individual spot associated with it is illuminated, fluorescent radiation is excited therein and is imaged on the detector. Since the individual light sources of the light source group can be switched on freely, a random access selection can be made from the stationary individual spots. There is no longer a predefined sequence for scanning the sample, and there is no longer any movement of individual spots.

When the detector arrangement has only one detector having no further spatial resolution, always exactly one of the individual light sources is switched on in each instance. Use of a non-spatially resolving individual detector yields a particularly good signal-to-noise ratio and, therefore, a low detection limit for excited fluorescent radiation.

A plurality of light sources can be switched on simultaneously when the detector arrangement has a detector pixel array and the optics additionally image every pinhole element on a detector pixel or an individual detector pixel group. An embodiment form of this kind allows an accelerated detection of the sample because imaging can be carried out at a plurality of locations simultaneously.

The detector arrangement can utilize a camera in which every individual spot is imaged on a detector pixel, i.e., camera pixel. Alternatively, individual detector arrays are also possible. Naturally, combination forms are also conceivable in which n individual spots are imaged on m detector elements of a detector array (i.e., by means of pinhole array and light source group with n elements in each instance), where n is a whole number multiple of n. For example, 512×512 individual light sources and pinhole elements can be imaged on 128×128 detector pixels. Accordingly, when activating the individual light sources it need only be ensured that two individual light sources whose fluorescent radiation reaches the same detector pixels are not switched on simultaneously. The control arrangement is accordingly also suitably constructed in this embodiment form.

In order to prevent crosstalk between simultaneously illuminated individual spots, it is preferable to switch on individual light sources in the light source group which have individual spots that are not directly adjacent. In a particularly preferable manner, the spacing between simultaneously illuminated individual spots is selected in such a way that a ratio between individual spot spacing and individual spot diameter does not fall below 5:1. In other words, there is preferably always a distance of at least three unilluminated individual spots between two simultaneously illuminated individual spots. A control device which is configured to actuate the light source group in the above-mentioned manner and to suitably configure the detector pixel array is preferably provided for this characteristic of the microscope.

It is particularly advantageous that the scanning of the sample according to the invention makes do without mechanically actuated parts. Rather, the scanning is carried out purely electronically through suitable switching on of individual light sources.

The pinhole array is jointly responsible for forming the individual spots. It can be formed as a pattern of holes in a suitable diaphragm. A light-conducting fiber bundle, for example, a single-mode fiber array, can also be used so that each pinhole element is formed through a light-conducting fiber of the light-conducting fiber bundle. Accordingly, the individual light-conducting fibers act like a confocal pinhole for the corresponding individual spot. The arrangement of the pinhole array in the form of a light-conducting fiber bundle is particularly advantageous for endoscopic applications because beam guidance is then highly flexible.

If the pinhole array is implemented as a light-conducting fiber bundle, it is preferable that the optics have a GRIN lens which is arranged on an end of the light-conducting fiber bundle on the sample space side, and the radiation is bundled into the individual spots. This embodiment is particularly favorable for endoscopic applications because a robust, adjustment-free, extremely compact construction is achieved in this way. The latter feature is favorable above all for endoscopic applications.

A light-conductor-based embodiment can also be applied with respect to the distribution of illumination radiation and imaging of the individual spots. In a further development of the invention in this regard, the radiation from the light source group is coupled directly into a light-conducting fiber bundle such that the radiation of each individual light source arrives in an individual light-conducting fiber. A fiber coupler which conducts the radiation from the individual spot directly to the detector arrangement is incorporated in this light-conducting fiber. Accordingly, this light-conducting fiber arrangement implements not only the pinhole arrangement, but also substantial portions or even all parts of the optics and is particularly suitable for endoscopic application. It is also optionally possible in this case to realize the light source group through a group of individual light sources which are individually arranged on the individual light-conducting fibers of the light-conducting fiber bundle in each instance. This has the advantage that individual light sources can be used whose constructional size can be substantially freely selected. The same is true for the detector arrangement. The light-conducting fiber bundle can optionally be guided directly to a non-spatially resolving detector, to a spatially resolving detector whose pixels are associated with the individual light-conducting fibers, or to an individual detector group, wherein each individual detector receives the radiation from one or more individual light-conducting fiber(s). In the latter variant, the constructional size of the individual detectors can likewise be substantially freely selected.

The individual spots can be formed in the sample space in such a way that adjacent individual spots barely overlap in the sample. In this case, an optimal resolution is obtained when scanning the sample. To achieve this characteristic, it is preferable that the optics additionally have an imaging element (e.g., zoom optics) which is arranged between the pinhole array and sample space and which brings about the overlapping of adjacent individual spots in the sample space.

In order to scan a sample space which is much more extensive than is allowed by confocal imaging with the pinhole array, it is preferable that a mechanical image displacement arrangement which adjusts the position of all of the adjacent individual spots simultaneously is arranged downstream of the pinhole array. Of course, the individual spots remain stationary relative to one another. This mechanical image field adjustment can be much slower compared to conventional scanners because it is used only to enlarge the image field. This invention can optionally be combined with the imaging element (zoom optics).

The light source group is particularly preferably formed as a light source array in which the light sources are adjacent to one another, preferably with a pitch of from 10 to 20 μm. To this end, it is advantageous to use the light source array shown in U.S. Pat. No. 7,518,149 B2 because this light source array already emits a pre-collimated illumination bundle for each individual light source. The disclosure of this publication is incorporated in its entirety by reference with respect to the description of this light source array. Another advantage aside from the relatively small beam angles through pre-collimation consists in the small extension of each individual source, which makes it possible to improve focusing.

A light source array of the type mentioned above is an example of an LED array. LED illumination has the advantage that it enables switching frequencies of up to 100 MHz, also with intensity modulation. The switching frequency of the individual light sources determines the scanning speed.

According to the invention, the illumination radiation can be adjusted individually for every individual spot. This is a great advantage for certain fluorescence microscopy procedures such as FLIM or lock-in detection techniques. Accordingly, for example, the individual spots can be modulated differently and can accordingly separate adjacent image points through different modulations or demodulations.

An additional further development of the invention consists in that different color channels can be used when the illumination arrangement has a plurality of light wave groups emitting in different wavelength regions and a combiner device which superimposes the radiation of the light wave groups such that the optics irradiate the pinhole elements with spectrally adjustable radiation.

The invention has the advantage of a compact construction. Separate illumination modules for the microscope are no longer required. Mechanical scanners which can be problematic with respect to robustness and expenditure on adjustment can also be dispensed with. Moving components are no longer necessary.

At the same time, this allows a simple miniaturization of the microscope and enables applications in endoscopy, on-site substance screening, miniaturized "labs on chip", and so on.

Doing away with expensive lasers and mechanical scanners not only reduces the manufacturing costs but simultaneously also speeds up the measuring process because mechanically moving components need no longer be actuated.

Not only is a speed-up made possible by the microscope, but surprisingly an optionally slow scanning of the sample can also be realized. This too is impossible with conventional oscillating mirror scanners whose basic mechanical limitations predetermine a minimum speed for scanning the sample.

Free access to the individual spots which are to be illuminated and imaged allows optional scanning schemes for the sample without the construction-related problems of the prior art.

When an area detector is used in the detector arrangement, confocal imaging and widefield microscopy can both be realized with one and the same microscope. For this purpose, it is merely necessary to switch on all of the light sources of the light wave group. In this type of widefield microscopy, any regions of interest can be predetermined by suitable actuation of the light wave group. For individual spots which are not to be illuminated, the corresponding light sources are simply switched off.

The use of individually actuated light sources allows a direct power regulation for each individual spot in confocal mode as well as in widefield mode. Each individual light source is adjusted with respect to the radiation intensity, e.g., by the operating current (other parameters, e.g., voltage, are possible).

In a further development of the invention, simultaneous excitation of different or identical regions of interest with different wavelengths realizes the scanning of the sample and a sample manipulation in one. The prior art always requires a plurality of scanning devices for this purpose.

It will be appreciated that the features which are mentioned above and which will be described in the following can be used not only in the indicated combinations but also in other combinations or individually without departing from the scope of the present invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figures 1, 2:
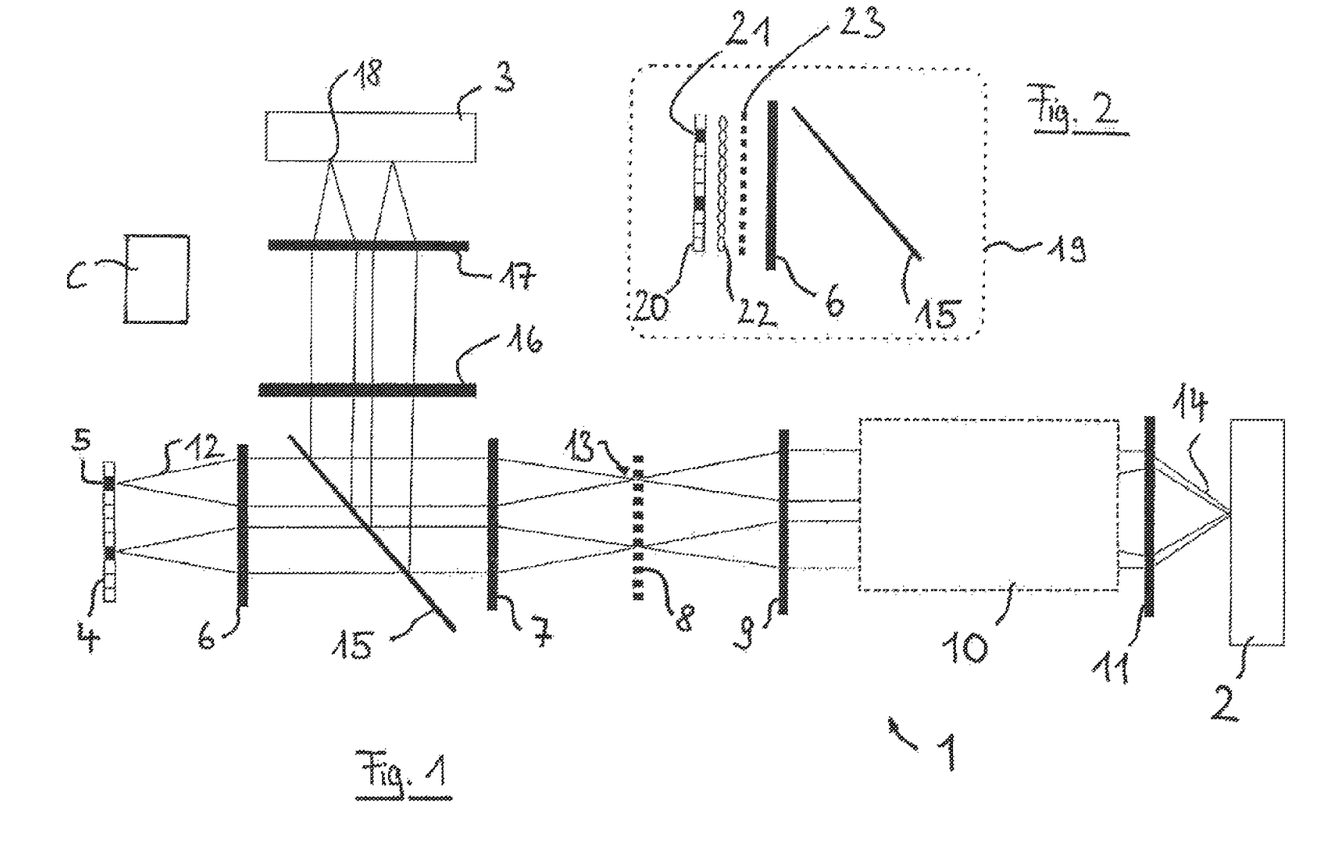
FIG. 1 shows a schematic diagram of a confocal microscope with freely adjustable sample scanning.
FIG. 2 shows a schematic diagram of an alternative embodiment of an illumination module for the microscope from FIG. 1.

FIG. 1 is a schematic diagram showing a microscope 1 which images a sample on a detector 3 by means of fluorescence microscopy, this sample being arranged in a sample space 2. An LED array 4 having LEDs 5 which can be switched on individually is provided as illumination source for fluorescence microscopy. The radiation from the illuminated LEDs 5 is guided to a pinhole array 8 via lenses 6 and 7, wherein an individual LED 5 is imaged on a pinhole 13. Every LED 5 is associated with a pinhole 13 through the arrangement of the LED array 4, lenses 6 and 7 and pinhole array 8. Together with a lens 11, a lens 9 which is arranged downstream of the pinhole array 8 in illumination direction images the pinhole array 13 confocally in individual spots 14 in the sample space 2. Accordingly, the radiation from each LED 5 is imaged confocally in individual spots 14.

Optional zoom optics 10 are provided between lenses 9 and 11 and allow the size and spacing of the individual spots 14 to be adjusted and accordingly allow an overlap between adjacent individual spots 14 to be adjusted. In addition, it optionally realizes an adjustable image displacement so that a larger image field can be detected.

Fluorescent radiation proceeding from the sample space 2 is collected from the individual spot 14 and guided via lenses 11, 9, pinhole array 8 and lens 7 to a preferably dichroic beamsplitter 15 which couples the fluorescent radiation out of the illumination beam path and images it on the detector 3 via a filter 16, which suppresses possible illumination radiation reflections, and via a lens 17. In so doing, every spot 14 in the sample space 2 is imaged on a spot 18 at the detector 3. The detector 3 has detector pixels (not shown in more detail). In the embodiment form shown in FIG. 1, every detector pixel is associated with a spot 18.

Figure 3:
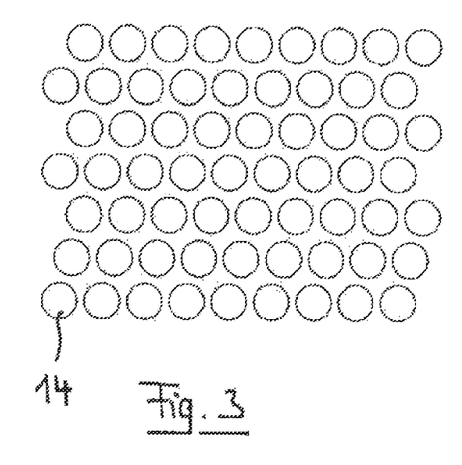
FIG. 3 shows a top view of the position of individual spots which are imaged by the microscope from FIG. 1 in a sample space and scanned therein.

A possible arrangement of the individual spots 14 in the sample space 2 is shown schematically in FIG. 3. As can be seen, a large number of individual spots 14 lie adjacent to one another. Their position and number correspond to those of the pinhole 13 and LEDs 5. The question of which individual spot 14 is illuminated depends exclusively on the actuation of the LED array 4, i.e., on which of the individual LEDs 5 is switched on.

The construction shown in FIG. 1 utilizes an LED array according to U.S. Pat. No. 7,518,159 B2 which has already been cited and which is incorporated herein.

Instead of a construction with an LED array of the kind mentioned above, the module 9 shown schematically in FIG. 2 can also be used, wherein the LED array 4 is replaced by a light source array 20 with individual light sources 21 which do not emit bundled radiation in contrast to the LEDs 5. Since there are accordingly no radiation characteristics within a narrow angle of beam spread (LED 5 of the LED array 4 emits beams in a beam angle of 25° to 30°), a minilens array 22 is arranged downstream of the light source array 20. Together with a diaphragm array 23, this minilens array 22 bundles the radiation of the individual light sources 21 in such a way that the lens 6 and the further optics subsequently cause the imaging through the pinhole array 8 into the individual spots 14. Here also, each individual spot 14 is associated with exactly one light source, in this case an individual light source 21, and is only illuminated when the corresponding individual light source 21 is on.

Figure 4:
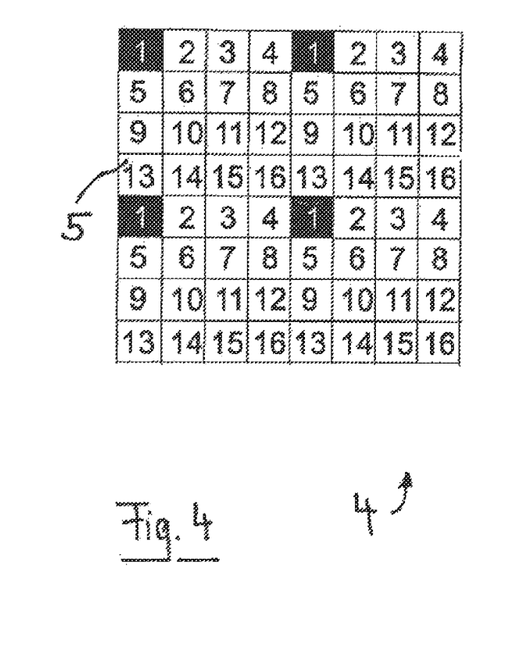
FIG. 4 shows a schematic diagram illustrating a sample scan made possible by the microscope from FIG. 1.

By way of example, FIG. 4 shows a possible parallel scan sequence which is adjusted at the microscope 1 so as to be controlled by a control device C which is suitably connected to the detector 3 and LED array 4. FIG. 4 shows a top view of the LED array 4 with the individual LED 5. The numbers entered in the LED array 4 in the diagram show the sequence in which the LEDs 5 are switched on. In the condition shown in FIG. 1, all of the LEDs for which the numeral "1" is entered are on simultaneously. In the next scanning step, only the LEDs which are provided with the numeral "2" are switched on, etc. Of course, other sequences are also conceivable as concerns the quantity of LEDs in the LED array 4 which are on simultaneously as well as the quantity of LEDs in LED array 4. As concerns the advantageous spacing of simultaneously illuminating spots, reference is had to the preceding general part of the specification.

Figure 5:
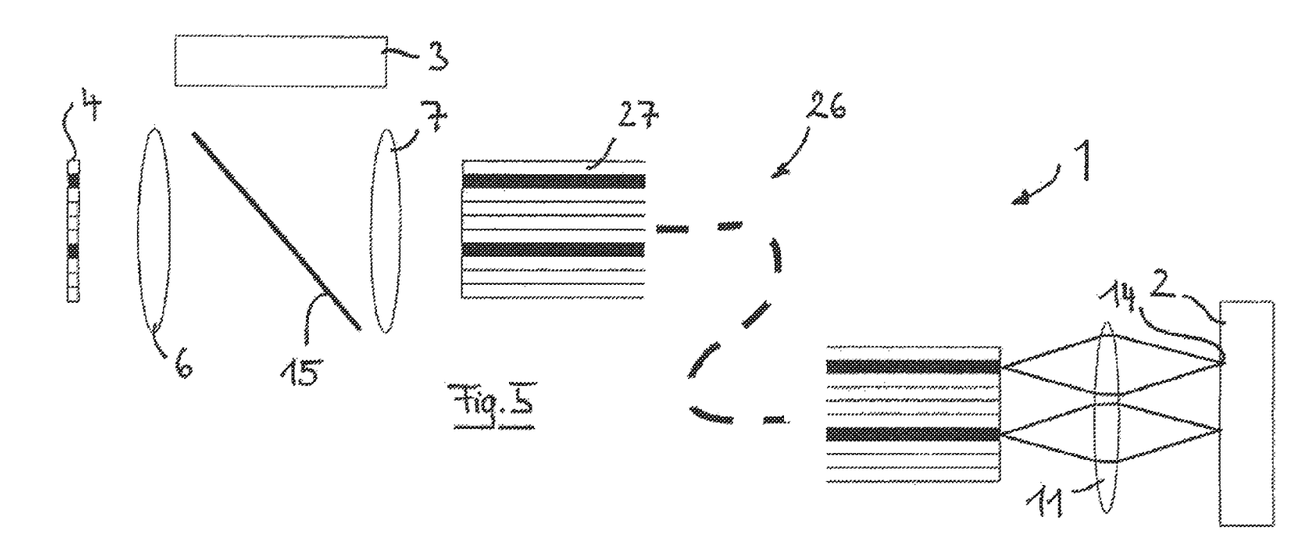
FIG. 5 shows a schematic diagram showing a modified construction of the microscope from FIG. 1, wherein the modification relates to a pinhole array.
Figure 6:
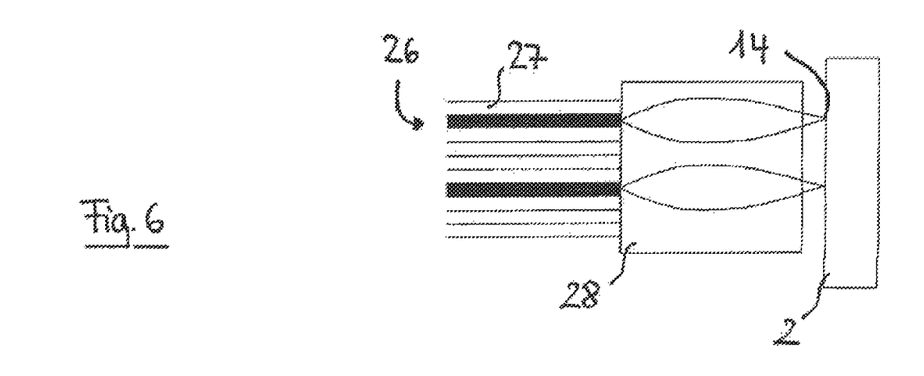
FIG. 6 shows a further development of the microscope from FIG. 5.

FIG. 5 shows a modification of the microscope 1 shown in FIG. 1 in which the pinhole array 8 is realized by a light-conducting fiber bundle 26. In this construction an individual pinhole is realized by an individual fiber 27. This kind of construction is particularly advantageous for application of the microscope in an endoscope, etc. In a modification of this construction, as is indicated in FIG. 6, a GRIN lens 28 can be arranged on a sample-side end of the light-conducting fiber bundle 26 to replace lens 11. In other respects, the construction shown in FIG. 5 or 6 substantially corresponds to the construction in FIG. 1.

Figure 7:
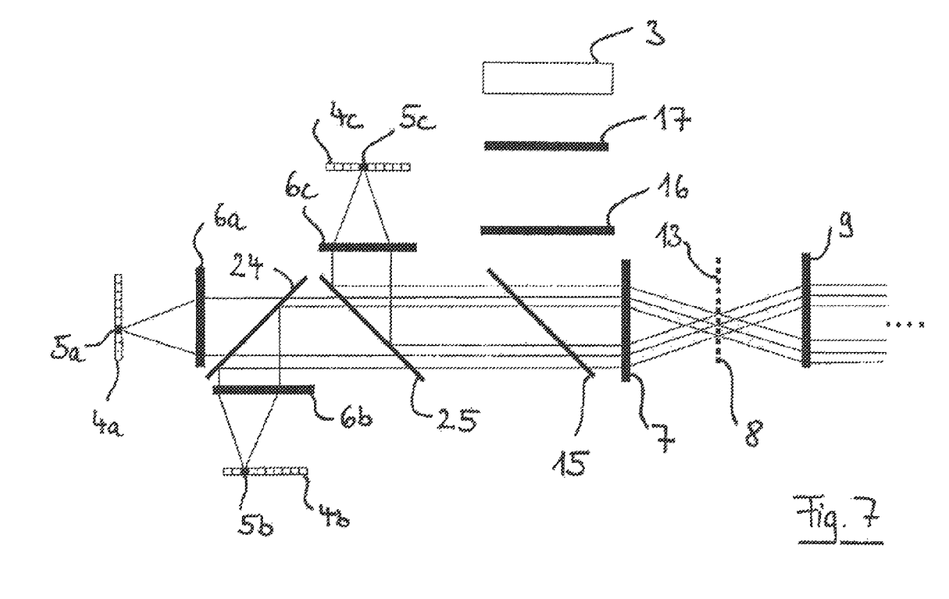
FIG. 7 shows a further development of the microscope from FIG. 1 relating to a multispectral illumination of the sample space.

FIG. 7 shows a further development of the microscope from FIG. 1 or 5/6 with respect to the illumination arrangement. Instead of an individual LED array 4, a plurality of LED arrays are now provided; three LED arrays 4a, 4b and 4c are shown in the example illustrated in FIG. 7. They differ from one another with respect to the spectral composition of the emitted radiation. Corresponding lenses 6a, 6b, 6c and beam combiners 24 and 25 superimpose the radiation from the three LED arrays 4a, 4b, 4c such that a multispectral illumination of the sample space 2 takes place. The three LED arrays are adjusted relative to one another in such a way that each individual LED 5a, 5b, 5c is again associated with exactly one pinhole 13. Alternatively, an LED array 4 can also be used in which the spectral composition of the radiation emitted by each LED 5 is adjustable by a control quantity (e.g., control voltage).

Of course, the quantity of three spectrally different LED arrays is purely exemplary. Fewer arrays, i.e., two arrays or more arrays can also be used depending on the desired spectral composition of the illumination radiation.

Figure 8:
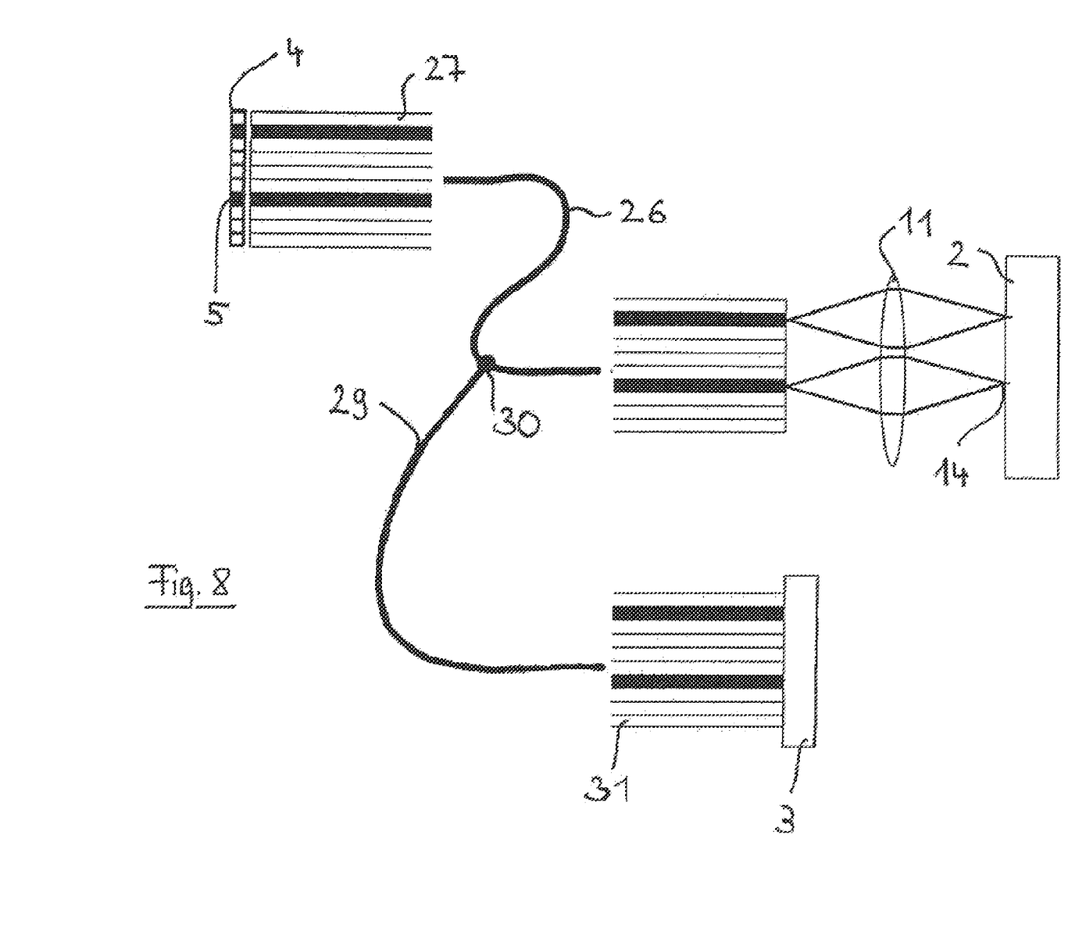
FIG. 8 shows a schematic diagram of a modified mode of construction of the microscope from FIG. 5.

FIG. 8 shows a modification of the microscope from FIG. 5 in which the light source array 4 couples the radiation directly into the light-conducting fiber bundle 26. The light-conducting fiber bundle 26 is provided with an out-coupling site 31 to which a light-conducting fiber bundle 29 having individual light fibers 31 leading to the detector 3 is coupled. The coupling site 30 is formed in such a way that every individual light fiber 27 is connected to exactly one individual light fiber 31. This type of construction is very compact, but has the disadvantage that no spectral differentiation is possible between the illumination of the individual spots 14 and the imaging of the individual spots 14. A dichroic configuration such as is preferably carried out in the beamsplitter 15 can generally not be realized at the coupling site 30. Therefore, the embodiment shown in FIG. 8 is particularly preferred for applications in which the signal-to-noise ratio of received fluorescent radiation in noncritical or in which backscattering, i.e., radiation having substantially the same wavelength composition as the illumination radiation, is received rather than fluorescent radiation.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A microscope for imaging of a sample arranged in a sample space, comprising:
    an illumination arrangement comprising:
        a light source group having individual light sources configured to be switched on individually;
    a detector arrangement; and
    optics configured to:
        illuminate individual spots located in the sample space, wherein adjacent spots overlap each other in the sample space; and
        image the individual spots on the detector arrangement;
    wherein each of the individual spots is associated with exactly one individual light source; and
    wherein a scanning of the sample is implemented by electrically switching the individual light sources to image a sequence of different spots.

2. The microscope according to claim 1;
    wherein the detector arrangement has a detector pixel array.

3. The microscope according to claim 1, further comprising:
a light-conducting fiber bundle.

4. The microscope according to claim 3;
wherein the optics have a gradient-index ("GRIN") lens which is arranged on an end of the light conducting fiber bundle on the sample space side, and the radiation is bundled into the individual spots.

5. The microscope according to claim 1;
wherein the optics have an imaging element which causes the overlapping of adjacent individual spots in the sample space.

6. The microscope according to claim 1;
wherein an image displacement arrangement is provided which displaces the position of all of the adjacent individual spots simultaneously in the sample space.

7. The microscope according to claim 1;
wherein the light source group is formed as a light source array in which the individual light sources are adjacent to one another.

8. The microscope according to claim 7;
wherein the light source array is an LED array.

9. The microscope according to claim 7, further comprising:
a control device which controls the light source array and which simultaneously switches on a plurality of individual light sources that illuminate individual spots which are not directly adjacent to one another.

10. The microscope according to claim 1;
wherein the illumination arrangement has:
a plurality of light source groups which emit in different wavelength regions; and
a combiner device which superimposes the radiation of the light source groups.

11. The microscope according to claim 7;
wherein the individual light sources of the light source array are adjacent to one another at a pitch of from 10 to 20 µm.

12. The microscope according to claim 1;
wherein the scanning of the sample is implemented by electrically switching the individual light sources without displacing the individual spots in the sample space.

13. The microscope according to claim 1;
wherein the scanning of the sample is implemented by electrically switching the individual light sources without mechanically moving a scanner.

14. The microscope according to claim 1;
wherein said optics allow the size and spacing of the individual spots to be adjusted.

15. The microscope according to claim 1;
wherein said optics allow an overlap between adjacent individual spots to be adjusted.

16. The microscope according to claim 1;
wherein said optics illuminate the individual spots confocally.

* * * * *